3,462,392
Patented Aug. 19, 1969

3,462,392
SYNERGISTIC STABILIZING COMPOSITION FOR POLYOLEFINS
Earl Kaplan, Metuchen, N.J., assignor to American Cyanamid Company, Stamford, Conn., a corporation of Maine
No Drawing. Filed Oct. 8, 1964, Ser. No. 402,614
Int. Cl. C08f 45/58
U.S. Cl. 260—45.85
4 Claims

ABSTRACT OF THE DISCLOSURE

This invention relates to the stabilization of polyolefins using a combination of dinonylphenol and methylene-bis-dinonylphenol as the stabilizer. It relates further to polyolefins having improved light stability by having incorporated therein an effective amount of the above-named light stabilizer. Still further, it relates to a new composition of matter comprising 90 to 25 percent by weight of dinonylphenol and 10 to 75 percent by weight of 2,2'-methylene-bis(4,6-dinonylphenol).

---

This invention relates to stabilization of polyolefins and, more particularly, to a method for stabilization using a combination of a dinonylphenol and a methylene-bis-dinonylphenol, to the stabilizing composition and to the composition thus stabilized.

More specifically, it relates to stabilization using a combination of two compounds, individually known or expected to give antioxidant protection to polyolefins, namely, a combination of 2,4-dinonylphenol and 2,2'-methylene-bis(4,6-dinonylphenol).

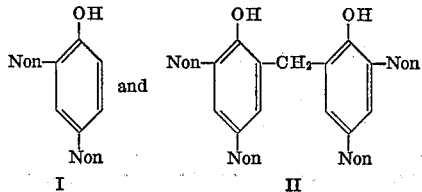

wherein "Non" is a nonyl radical.

Degradation of polyolefins such as polyethylene and polypropylene by the action of heat and exposure to air and light presents serious problems in their practical applications and limits their use and durability.

Various types of materials have been proposed and used to stabilize these polymers against the adverse effects of oxygen, heat and light, but they leave much to be desired. Particularly with polypropylene there is an additional problem encountered, in that high processing temperatures are often necessary and, for practical purposes, the polymer must be protected during the processing as well as during extended periods of use. Compounds used as protective agents have included various types of phenolic compounds, some of which do afford a certain degree of antioxidant protection against the effects of oxygen and heat.

The present invention is based on the discovery that superior protective effects are obtained when combinations, within certain ranges, of 2,4-dinonylphenol (referred to hereinafter as phenol-I) and 2,2'-methylene-bis(4,6-dinonylphenol) (referred to hereinafter as bisphenol-II) are used for stabilizing purposes for polyolefins.

Although some degree of protection is afforded when either the phenol or bisphenol is used alone, it is particularly surprising that such superior effects are obtained by use of the combinations, even when only a very small amount of the one is used in the presence of the other. Also, superior effects are obtainable using the combination which cannot be achieved by either additive alone even at increased concentrations.

The combination is normally used in the presence of other additives, for example, as with polypropylene in the presence of one of the known thio stabilizing compounds, exemplified by dilauryl thiodipropionate. These may be defined more broadly by the formula:

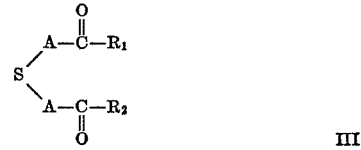

III wherein $R_1$ and $R_2$ are substituents selected from the group consisting of —OH,

and —$OR_5$ wherein $R_3$ and $R_4$ are substituents selected from the group consisting of hydrogen and lower alkyl radicals having 1–6 carbon atoms and $R_5$ is an alkyl radical having from 4–18 carbon atoms, and A is an alkylene radical containing from 1–3 carbon atoms.

Illustrative thio compounds within the general Formula III are alkyl esters of 3,3'-thiodipropionic acid, wherein the alkyl group has 4–18 carbon atoms, such as dibutyl, diamyl, dihexyl, dioctyl, diisooctyl, di-2-ethyl-hexyl, dilauryl, distearyl, and the like.

Other additives may also be present in conventional amounts such as:

A. Phosphites exemplified by trialkyl phosphites where the alkyl radical has from 1 to 20 carbon atoms, such as triisodecyl phosphite, trioctylphosphite; aralkyl phosphites wherein the alkyl radical has 1 to 20 carbon atoms and the aryl radical has up to two six-membered carbocyclic moieties mixed aryl alkyl phosphites such as phenyldidecyl phosphite, diphenyldecylphosphite; and triarylphosphites such as tris(p-nonylphenyl)phosphite.

B. Light stabilizers such as ultraviolet absorbing compounds of the class of o-hydroxybenzophenones, 2-hydroxyphenylbenzotriazoles, tris - o - hydroxyphenyl-s-triazines, etc.

C. Lubricants, fillers, antistatic agents, etc.

For protection of the polyolefin, the protective combination is used at a concentration of from about 0.01% to about 1.0%.

As to the ratio of the phenol to the bisphenol, the combination may contain from about 10 to 75% of the bisphenol and from about 90 to 25% of the phenol. A practically useful ratio is about a 50–50 mixture of the phenol and bisphenol. Stated alternatively, in a polymer such as polypropylene, the concentration of this 50–50 combination would be 0.2% or a concentration each of the phenol and the bisphenol of 0.1%.

The combination of the invention affords protection against the effects of heat for extended periods, but it is a further advantage of the invention that improved light stability also is achieved as illustrated by an improved brittle point test result on exposure to both heat and light. This light stability is a further important, advantageous aspect of this invention.

The results are particularly surprising in view of the fact that using the dinonylphenol (0.15%) with a known commercial antioxidant (0.05%) (Santowhite Powder, 4,4'-butylidenebis(6-t-butyl-m-cresol), no improved or synergestic effect is obtained.

The phenol and bisphenol combination may be prepared by admixing the two materials before use in the polyolefin composition; or they may be added to the polyolefin separately in the proper concentrations.

For practical purposes, however, on a commercial scale, it is convenient to use a mixture obtained from the reaction of 2,4-dinonylphenol with formaldehyde whereby the bisphenol concurrently is formed. Such a reaction may be controlled so that the product mixture contains about 10 to 50% of the bisphenol with 90 to 50% of the phenol. Preferably, such a product, for commercialization, contains about 10 to 20% of the bisphenol and 90 to 80% of the phenol. Commercial grade 2,4-dinonylphenol, may be used without adverse effect.

The product mixture as described above is useful generally for stabilizing polyolefins derived from olefins of 2-4 carbons. For convenience in handling and for maintenance of good color, the product may be mixed with from 5 to 50% of a phosphite stabilizer based on the combined weight of the phenols. Normally, the product is a viscous liquid and the addition of an appropriate phosphite stabilizer can serve a three-fold purpose:

(1) It lowers the viscosity of the composition, thus making it easier to handle.
(2) It improves the color stability of the stabilizing composition.
(3) It improves stabilizing activity in the polymer during the processing steps.

In terms of polyolefin, the phosphite may be added in a concentration of 0.1 to 1.0 percent by weight. Thus, a convenient composition would be one containing about 25% phenol, 25% bisphenol and 50% phosphite (e.g., phenyl didecylphosphite; or another phosphite such as triisodecylphosphite, tris(p-nonylpenyl)phosphite and diphenyldecylphosphite).

An important advantage of the composition is an economic one in that the dinonylphenol is relatively inexpensive and the combination gives results definitely superior to those obtained with more expensive commercial products such as Santowhite Powder.

The invention is further illustrated by the examples which follow.

Example 1.—Preparation of mixture of 2,4-dinonylphenol and 2,2'-methylene-bis(4,6-dinonylphenol)

A mixture of 34.6 (0.1 mole) of commercial grade 2,4-dinonylphenol and 0.6 g. (0.02 mole) of para-formaldehyde in 50 cc. of heptane is refluxed for four hours in the presence of four drops of a surfactant and 7.8 cc. of concentrated hydrochloric acid. The reaction mixture is then treated with 200 cc. of 5% aqueous potassium hydroxide solution and stirred for one hour. The heptane layer is removed, washed with water and then treated with 2 g. of ion exchange resin. After stirring for three hours, the mixture is treated with activated charcoal, dried, filtered and the solvent removed. The resulting viscous liquid contains approximately 4% p-nonylphenol, 81% 2,4-dinonylphenol and 15% methylene-bis derivative of the latter.

The p-nonylphenol is present in commercially available 2,4-dinonylphenol.

Example 2

Films of polypropylene containing the stabilizer to be tested were prepared as follows:

The test composition was dry-blended with the polypropylene for four hours and milled on a two-roll laboratory mill, by fluxing on the hotter roll (375° F.) for five passes. From the milled sheets, a sample of 2 x 2 inches was cut and molded into a film of 12 to 15 mils at 350° F. and 25 tons of pressure.

Individual film samples containing the additives as tabulated below, were aged in an air-circulating oven at 140° C. and the time of exposure in the oven until the sample became embrittled, was observed.

In addition, samples of the films were exposed in a Fade-Ometer and the hours exposure to brittle point observed.

The results are shown in the following table.

TABLE I
[Polypropylene containing 0.2% distearyl thiodipropionate]

| Run No. | 2,4-dinonyl-phenol, percent conc. | 2,2'-methyl-enebis (4,6-di-nonylphenol) percent conc. | Hours to brittle point | |
|---|---|---|---|---|
| | | | Oven-aged at 140° C. | Fade-Ometer exposure |
| 1 | Control none | | 4 | 100 |
| 2 | 0.2 | | 375 | 350 |
| 3 | | 0.2 | 500 | 250 |
| 4 | 0.18 | 0.02 | 800 | 500 |
| 5 | 0.15 | 0.05 | 910 | 450 |
| 6 | 0.10 | 0.10 | 1,000 | 450 |

From this table, it should be noted that in spite of the constant concentration in which additives were used, and contrary to expectation, the degree of stability varied widely among the individual samples. Samples 2 and 3 with 0.2% of either 2,4-dinonylphenol or 2,2'-methylene-bis(4,6-dinonylphenol) had only fair stability against embrittlment. Sample 4, with a mixture of the two phenols had excellent stability and samples 5 and 6 with a higher concentration of the methylenebis compound had extraordinary properties in this area. In addition to this advantage, the stabilizer of this invention was able to give a considerable boost in stability against deterioration by light radiation, as compared to that given by the individual phenols.

It is very surprising that the combination of 2,4-dinonylphenol with 2,2' - methylene-bis(4,6 - dinonylphenol) leads to such a useful stabilizing system. When 2,4-dinonylphenol is used with another commercially available stabilizer, i.e., Santowhite Powder, 4,4'-butylidene-bis(6-t-butyl-m-cresol) no such improvement is obtained. In fact, the latter becomes *less* effective. This is apparent from the following table.

TABLE II
[Polypropylene containing 0.2% distearyl thiodipropionate]

| Run No. | 2,4-dinonyl-phenol, percent conc. | 4,4'-butyli-dene-bis(6-t-butyl-m-cresol) | Hours to brittle point | |
|---|---|---|---|---|
| | | | Oven-aged at 140° C. | Fade-Ometer exposure |
| 7 | 0.15 | 0.05 | 400 | 350 |
| 8 | | 0.2 | 500 | 150 |

Example 3.—Evaluation of mixture of 2,4-dinonylphenol, 2,2'-methylene-bis(4,6-dinonylphenol) and a phosphite Films of polypropylene containing 0.2% of the mixture of Example 1, 0.2% distearyl thiodipropionate and 0.2% of a phosphite, were tested according to the procedure in Example 2. The results were as follows.

TABLE III

| Run No. | 0.2% phosphite | Hours to brittle point | |
|---|---|---|---|
| | | Oven-aged at 140° C. | Fade-Ometer exposure |
| 9 | None | 895 | 350 |
| 10 | Tris(p-nonylphenyl)phosphite | 1,165 | 450 |
| 11 | Phenyldidecylphosphite | 1,570 | 550 |

Example 4.—Evaluation of mixture of 2,4-dinonylphenol and 2,2'-methylene-bis(4,6-dinonylphenol) with U.V. absorber Films of polypropylene containing 0.2% of Example 1, 0.2% dilaurylthiodipropionate, 0.2% phenyldidecylphosphite and 0.2% 2-hydroxy-4-octyloxybenzophenone were tested according to the procedure of Example 2. The sample when exposed to Fade-Ometer became embrittled in 1350 hours.

In the foregoing examples which are intended only to illustrate, not limit this invention, other additives could have been employed instead of those used, and polypropylene could have been replaced by other polymers of 2–4 carbon olefins such as ethylene and isobutylene. Instead of DSTDP, there could have been used dilauryl thiodipropionate or lauryl stearyl thiodipropionate. Similarly, such phosphites as diphenyldecylphosphite or tris-(p-nonylphenyl)phosphite could have been used in place of the phosphite of Example 3.

Example 5

The following experiment shows that the synergistic improvement observed with the phenols of this invention is not generally obtainable merely by substituting combinations of monocyclic and bicyclic anologs of these phenols.

Polypropylene films containing 0.2% distearyl thiodipropionate and 0.2% of a phenol or two phenols as indicated below were tested by the procedure of Example 2 for stability in the oven and the Fade-Ometer. Hours to embrittlement are noted in the following table.

TABLE IV

| Run No. | Stabilizer | Hours to embrittlement | |
|---|---|---|---|
| | | Oven-aged at 140° C. | Fade-Ometer exposure |
| 12 | 2,2'-methylene-bis(4-methyl-6-tert-butylphenol), 0.2%. | 730 | 150 |
| 13 | 2,2'-methylene-bis(4-methyl-6-tert-butylphenol), 0.1%; 4-methyl-6-tert-butylphenol, 0.1%. | 630 | 150 |
| 14 | 2,2'-methylene-bis(4,6-di-tert-butylphenol), 0.2%. | 550 | 150 |
| 15 | 2,2'-methylene-bis(4,6-di-tert-butylphenol), 0.1%; 2,4-di-tert-butylphenol, 0.1%. | 330 | 250 |

I claim:
1. A composition comprising a polymer of a monoolefin having 2 to 4 carbon atoms stabilized with
(a) from 0.1 to 1.0 weight percent of a mixture of 90–25% by weight of a phenol of the formula:

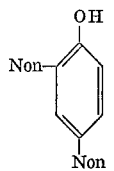

and 10–75% by weight of a bisphenol of the formula:

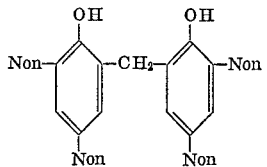

wherein "Non" is nonyl and
(b) an alkyl ester of 3,3'-thiodipropionic acid wherein the alkyl group has 4–18 carbon atoms.
2. The composition of claim 1 wherein the alkyl group is lauryl.
3. The composition of claim 1 wherein the alkyl group is stearyl.
4. The composition of claim 1 wherein equal parts by weight of the phenol and bisphenol are present.

References Cited

UNITED STATES PATENTS

| 2,985,617 | 5/1961 | Salyer et al. | 260—45.7 |
| 3,000,857 | 9/1961 | Craven | 260—45.95 |
| 3,039,993 | 6/1962 | Friedman | 260—45.7 X |
| 3,103,501 | 9/1963 | Shearer | 260—45.95 |
| 3,115,465 | 12/1963 | Orloff et al. | 260—45.95 X |

FOREIGN PATENTS 1,235,047  5/1960  France.

OTHER REFERENCES

Kitchen et al.: Ind. & Eng. Chem., 42, 1950, pp. 675–676.

DONALD E. CZAJA, Primary Examiner

M. J. WELSH, Assistant Examiner

U.S. Cl. X.R.

252—404; 260—30.6, 45.7, 45.8, 45.95